J. VOLPERT.
ASH SIFTER.
APPLICATION FILED JULY 27, 1918.
1,300,675.
Patented Apr. 15, 1919.
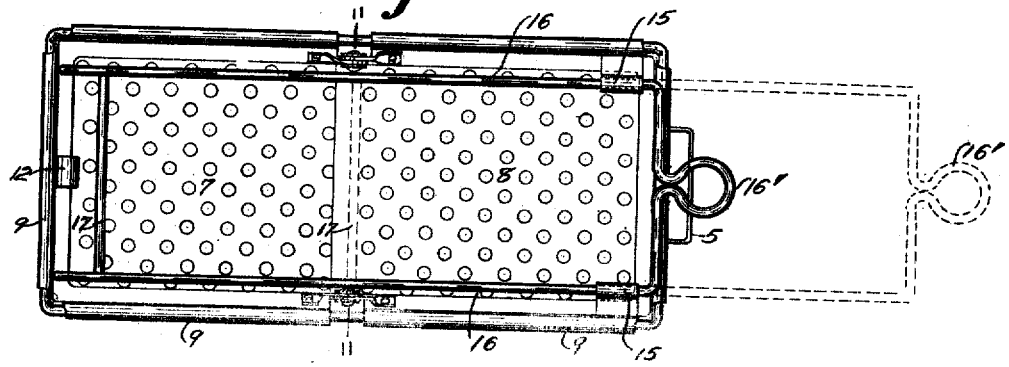
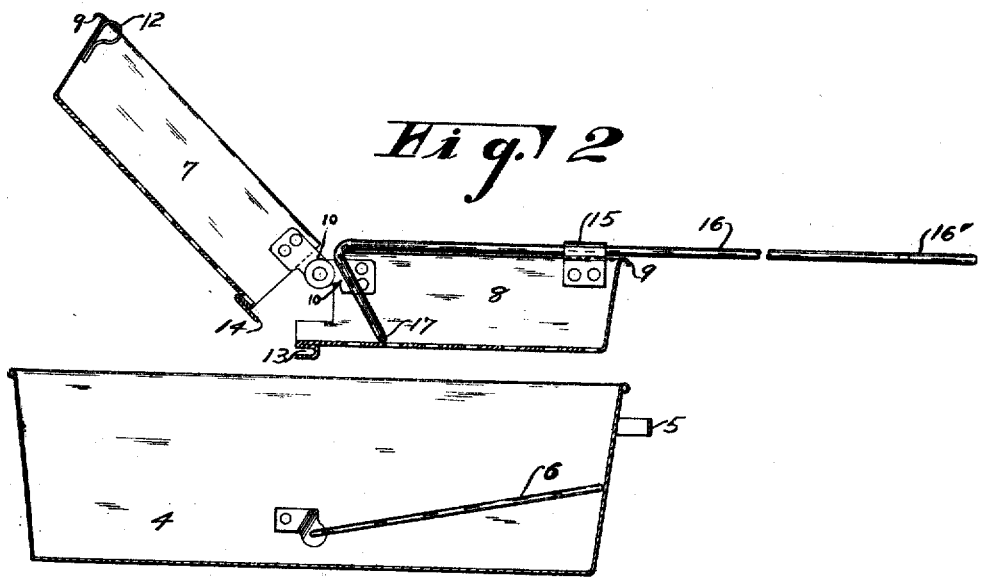
Witness
Lulu E. Ehrhardt
Alice Ehrhardt
Inventor
Joseph Volpert
By Herbert E. Toelle
Attorney

UNITED STATES PATENT OFFICE.

JOSEPH VOLPERT, OF MILWAUKEE, WISCONSIN.

ASH-SIFTER.

1,300,675.

Specification of Letters Patent.

Patented Apr. 15, 1919.

Application filed July 27, 1918. Serial No. 247,005.

*To all whom it may concern:*

Be it known that I, JOSEPH VOLPERT, a native of Russia, residing at Milwaukee, in the county of Milwaukee and State of Wisconsin, have invented a certain new and useful Improvement in Ash-Sifters, (Case 1,) of which the following is a full, clear, concise, and exact description, reference being had to the accompanying drawings, forming a part of this specification.

My invention consists in what is herein particularly described with reference to the accompanying drawings and pointed out in the claims of this specification, its object being to provide simple, economical and efficient sifters, applicable in detachable connection with ash-pans for the ready separation of cinders and unburnt fuel from ashes, each sifter being composed of hingedly connected screen-sections and having therewith a reciprocative scraper.

Figure 1, of the drawings represents a plan view of a sifter in accordance with my invention, and Fig. 2, a vertical longitudinal section of said sifter lifted out of an ash-pan of ordinary construction in which it is ordinarily suspended, a section of the sifter being tilted out of normal position.

Referring by numerals to the drawings, 4 indicates the ash-pan provided with the usual handle 5, and bail 6, the position of the bail being normally that herein shown.

The sifter comprises a pair of hingedly connected sections 7, and 8, having upper outer flanges 9, for the detachable connection of said sifter with the rim of the ash-pan. As herein shown, ears 10, of the sifter sections are engaged by pintle-rivets 11, to therewith constitute the hinges by which said sifter sections are joined. Each sifter section is ordinarily constructed of sheet-metal and has the bottom thereof suitably perforated or otherwise fashioned to serve as a screen.

The inner meeting ends of the sifter sections are open, and the bottom of one section is extended to form a stop underlapping the bottom of the other section, when both of said sections are in normal position. This engagement of the sifter sections serves to limit downward movement of the one 7, that is shown provided with a handle 12, upon the inside of its closed end. As shown, the bottom of the sifter section 8, may be flanged and the flange 13, fashioned to form a groove with which to engage the bottom extension or tongue 14, of the other sifter section 7, when the latter is in its normal position.

In rigid connection (by rivets or otherwise) with the side walls of the sifter section 8, adjacent to its closed outer end, are guides 15, for a scraper. The scraper is shown as preferably comprising a suitable bent rod 16, having inturned ends, and another rod 17, that extends transversely of the sifter adjacent to the bottom of the same, the ends of the two rods being matched and rigidly connected by rivets or other suitable means. The bending of the rod 16, is such as to provide the scraper with an outwardly extending central handle 16', by which to manipulate said scraper in its guides. The scraper as a whole serves as a handle by which to lift and carry the sifter away from the ash-pan.

The sifter is set in the ash-pan to receive material shook down or dumped from a fire-pot, and by reciprocation of the scraper said material is agitated to effect a ready separation of ashes from cinders and unburnt fuel. The ashes fall through the screen bottom of the sifter into the ash-pan and the screened material remains in said sifter from which it is dumped into the aforesaid fire-pot or other convenient receptacle.

If the scraper be retracted to clear the sifter section 7, the latter may be swung up to discharge clinkers or other material thereon into the ash-pan, and similar material may be forced off the bottom of the sifter section 8, into said pan by an inward movement of said scraper.

I claim:

1. A sifter comprising hingedly connected screen-bottom sections open at their meeting ends, and a reciprocative scraper for which one of the sifter sections is provided with guides.

2. A sifter comprising hingedly connected screen-bottom sections open at their meeting ends, ears in connection with one of the sifter sections to constitute guides, and a reciprocative scraper engaging the guides.

3. A sifter comprising hingedly connected screen-bottom sections open at their meeting ends and having upper outer suspending flanges, and a reciprocative scraper for which one of the sifter sections is provided with guides.

4. A sifter comprising hingedly connected screen-bottom sections open at their meeting ends, the bottom of one section being extended to underlap that of the other section when both are in normal position, and a reciprocative scraper for which one of the sifter sections is provided with guides.

5. A sifter comprising hingedly connected screen-bottom sections open at their meeting ends, the bottom of one section being flanged and the flange fashioned to provide a groove with which to engage a bottom extension of the other sifter section when both of said sections are in normal position; together with a reciprocative scraper for which one of the sifter sections is provided with guides.

In witness whereof, I hereunto subscribe my name this 23rd day of July, A. D. 1918.

JOSEPH VOLPERT.

Copies of this patent may be obtained for five cents each, by addressing the "Commissioner of Patents, Washington, D. C."